United States Patent
McGuire, Jr. et al.

(10) Patent No.: US 10,196,018 B2
(45) Date of Patent: Feb. 5, 2019

(54) CONCEALED EMBEDDED CIRCUITRY, VEHICLES COMPRISING THE SAME, AND RELATED METHODS

(71) Applicant: AERO Advanced Paint Technology, Inc., Columbus, OH (US)

(72) Inventors: James E. McGuire, Jr., Tiburon, CA (US); Andrew C. Strange, Worthington, OH (US)

(73) Assignee: AERO Advanced Paint Technology, Inc., Columbus, OH (US)

(*) Notice: Subject to any disclaimer, the term of this patent is extended or adjusted under 35 U.S.C. 154(b) by 0 days.

(21) Appl. No.: 15/790,491

(22) Filed: Oct. 23, 2017

(65) Prior Publication Data
US 2018/0056895 A1    Mar. 1, 2018

Related U.S. Application Data
(63) Continuation of application No. 14/657,989, filed on Mar. 13, 2015, now Pat. No. 9,821,734.

(51) Int. Cl.
*G06K 19/00* (2006.01)
*B60R 16/023* (2006.01)

(52) U.S. Cl.
CPC ................. *B60R 16/023* (2013.01)

(58) Field of Classification Search
CPC ....... G06K 19/07749; G06K 19/07745; G06K 19/07783; G06K 19/07773; G06K 19/083; G06K 19/04; G06K 19/077
USPC ........................................................ 235/492
See application file for complete search history.

(56) References Cited

U.S. PATENT DOCUMENTS

| | | | |
|---|---|---|---|
| 3,132,228 A | 5/1964 | Eisler | |
| 5,177,494 A | 1/1993 | Dorrie et al. | |
| 5,694,136 A | 12/1997 | Westfall | |
| 5,815,122 A | 9/1998 | Nurnberger et al. | |
| 5,837,909 A | 11/1998 | Bill et al. | |
| 6,206,292 B1* | 3/2001 | Robertz | G06K 17/0025 235/488 |
| 6,207,077 B1 | 3/2001 | Burnell-Jones | |
| 6,529,139 B1 | 3/2003 | Behun et al. | |
| 6,899,153 B1 | 5/2005 | Pollack et al. | |

(Continued)

FOREIGN PATENT DOCUMENTS

| | | |
|---|---|---|
| DE | 200 06 585 U1 | 7/2000 |
| DE | 10 2011 011001 A1 | 8/2012 |

(Continued)

OTHER PUBLICATIONS

"Antennas for Embedded Solutions," Hirschmann Car Communication, Inc. [Retrieved on Mar. 22, 2012 from http://www.hirschman-solutions.com].

(Continued)

*Primary Examiner* — Thien M Le
(74) *Attorney, Agent, or Firm* — The Griffith Law Firm, A P.C.; Lisa M. Griffith

(57) ABSTRACT

Electronic circuitry for mounting on articles, such as vehicles, is concealed by embedding the circuitry using at least an overlying polymeric material within a concealed embedded circuitry structure. The concealed embedded circuitry is capable of ready and effective application to an article and is capable of being retrofitted to articles after their fabrication.

34 Claims, 7 Drawing Sheets

(56) References Cited

U.S. PATENT DOCUMENTS

| | | | |
|---|---|---|---|
| 7,678,997 | B2 | 3/2010 | Rawlings |
| 7,847,745 | B2 | 12/2010 | Martin |
| 2004/0263405 | A1 | 12/2004 | Kogure et al. |
| 2008/0042849 | A1* | 2/2008 | Saito .................. A01K 11/006 340/572.7 |
| 2009/0140938 | A1 | 6/2009 | Ishibashi et al. |
| 2009/0186198 | A1 | 7/2009 | McGuire, Jr. |
| 2010/0059167 | A1 | 3/2010 | McGuire, Jr. |
| 2010/0237038 | A1 | 9/2010 | Chiang |
| 2011/0260935 | A1 | 10/2011 | Bortoin et al. |
| 2011/0273360 | A1* | 11/2011 | Campero ............. H01Q 1/2216 343/893 |
| 2011/0279335 | A1* | 11/2011 | Degen .................. H01Q 1/1271 343/705 |
| 2012/0127050 | A1* | 5/2012 | Song .................... H01Q 1/1271 343/756 |
| 2012/0234921 | A1* | 9/2012 | Tiedmann ............. G06K 19/02 235/488 |
| 2012/0261182 | A1 | 10/2012 | Megaridis et al. |
| 2012/0271564 | A1 | 10/2012 | Dudley et al. |
| 2015/0115042 | A1* | 4/2015 | Miura .................... H01Q 7/00 235/492 |
| 2016/0264078 | A1 | 9/2016 | McGuire, Jr. |

FOREIGN PATENT DOCUMENTS

| | | |
|---|---|---|
| GB | 1 184 344 A | 3/1970 |
| GB | 2 164 801 | 3/1986 |
| WO | WO-2002/09977 A1 | 2/2002 |
| WO | WO-2007/051497 A1 | 5/2007 |
| WO | WO-2016/148871 | 9/2016 |

OTHER PUBLICATIONS

"Embedded Antennas, Invisibles: New Generation of Invisible Embedded Antennas in Composite Car Roofs," [Retrieved on Dec. 11, 2012 from http://www.ficosa.com].

"Ficosa Fractal Antennas® Integrated in Vehicles," [Retrieved on Mar. 13, 2015 from http://www.ficosa.com].

"Foil Antennas," DS 280 590-701, Hirschmann Car Communication, Inc. [Retrieved on Mar. 13, 2015 from http://www.hirschmann-solutions.com].

"Mudflap VHF Antennas," GreenWave Scientific (Feb. 2011) [Retrieved on May 9, 2014 from http://www.greenwavescientific.com].

"Tranztenna," Fractal Antenna Systems, Inc. [Retrieved on May 9, 2014 from http://www.fractenna.com].

Kilian, Andreas "Conformal Superstrate Loaded Automotive Radar Antenna for Integration in Polymer Car Body Panels," *Proceedings of the Fourth European Conference on Antennas and Propagation*, Apr. 12-16, 2010, pp. 1-5 [ISSN: 2164-3342], (Apr. 16, 2010).

Moorehouse, David M. et al., "Improved UAV Datalink Performance Using Embedded Antennas," [Retrieved on Mar. 13, 2015 from https://www.cobham.com/media/83838/AUVSI-Paper.pdf].

Newcome, Nuke, "Technologies for 21st Century UAVs," (Jul. 6, 2005) [Retrieved on Mar. 13, 2015 from http://www.nasa.gov/centers/dryden/research/civuav/dhs_docs_prt.htm].

Pell, Brendan D. et al., "Advancements in Automotive Antennas, New Trends and Developments in Automotive System Engineering," Prof. Marcello Chiaberge (Ed.), ISBN: 978-953-307-517-4, InTech (2011), Available from: http://www.intechopen.com/books/newtrends-and-developments-in-automotive-system-engineering/advancements-in-automotive-antennas.

* cited by examiner

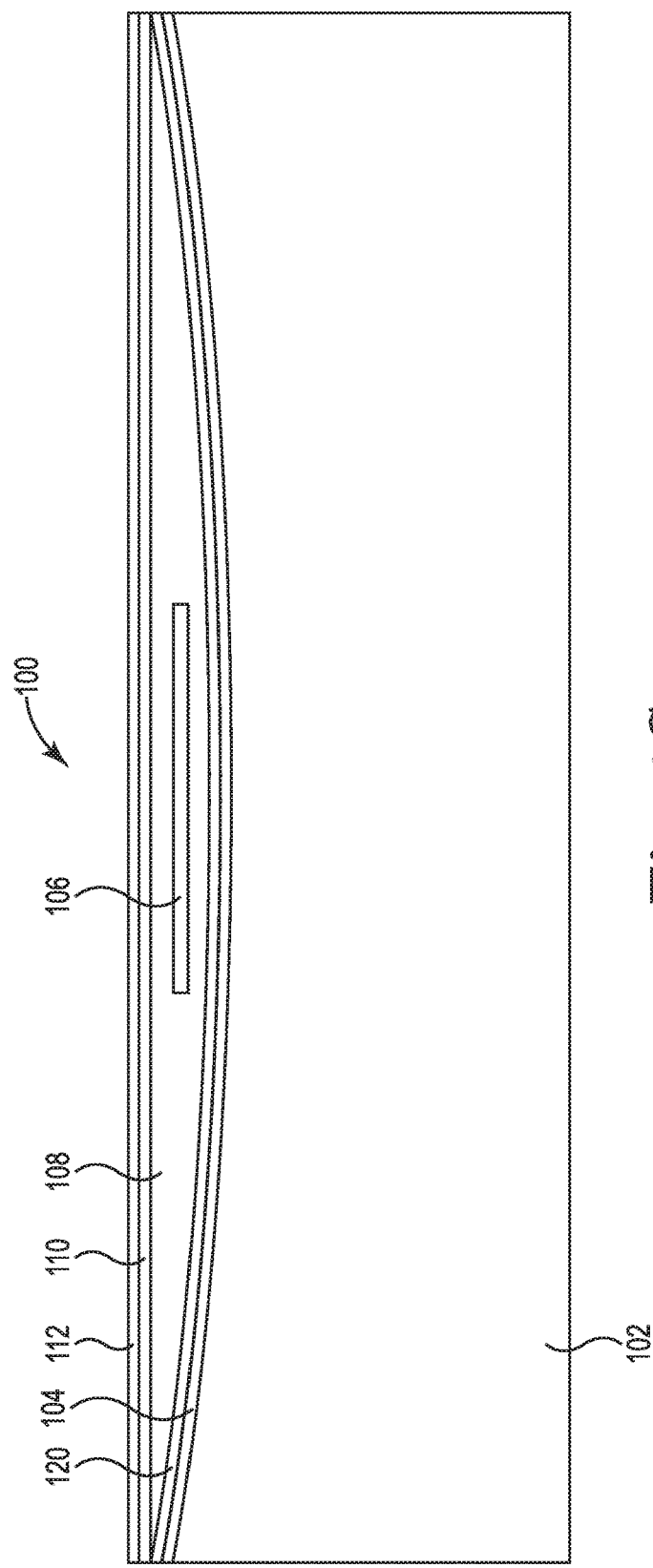

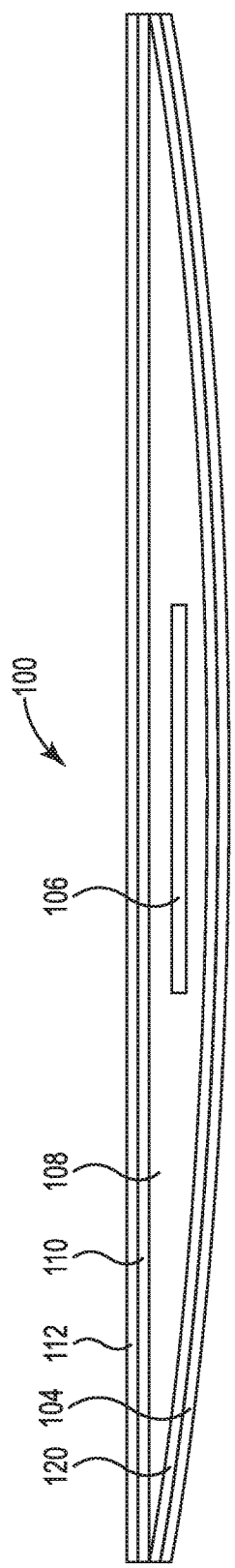

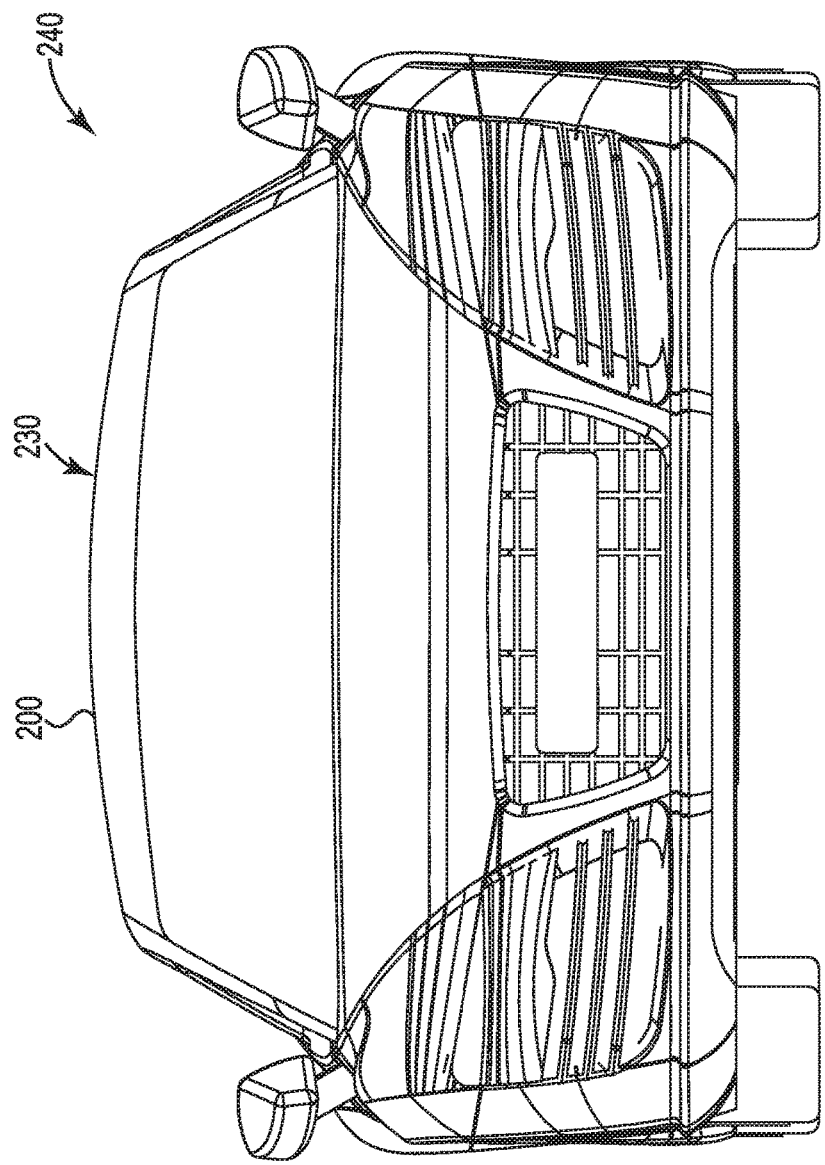

CONCEALED EMBEDDED CIRCUITRY, VEHICLES COMPRISING THE SAME, AND RELATED METHODS

CROSS-REFERENCE TO RELATED APPLICATIONS

This application is a continuation of U.S. patent application Ser. No. 14/657,989, filed on Mar. 13, 2015.

BACKGROUND OF THE INVENTION

The present invention relates generally to concealed embedded circuitry, vehicles comprising the same, and related methods.

A number of functional features relying on electronic circuitry are known for use in association with transportation vehicles (also referred to herein simply as "vehicles") and other objects. Such functionality includes, for example, that facilitating tracking, surveillance, de-icing, communicating, and the like. For example, antennas facilitating communication may comprise electronic circuitry. Functionality provided by electronic circuitry also encompasses conductive traces for power and signal supply supporting further functionality.

Previously, the use of antennas on vehicles was primarily limited to those employed for AM/FM radio. In contrast, today's vehicles are often fitted with many different antennas for purposes such as remote keyless entry, satellite navigation, and others. As technology evolves, vehicles increasingly require still more antennas for such things as mobile internet and mobile video, collision avoidance radar, and vehicle-to-vehicle or vehicle-to-infrastructure communication.

Electronic circuitry used for such purposes presents challenges when implemented on objects such as vehicles. For example, protruding circuitry can undesirably degrade aesthetics, aerodynamics, and is susceptible to physical damage when exposed on a vehicle.

Indeed, an important consideration with placement of electronic circuitry on a vehicle is visual appeal. It is often desired, for example, to paint conventional antennas in order to at least partially camouflage the same. However, much is documented in the literature about the problems associated with painting antennas on vehicles. In general, painting exterior surfaces on vehicles poses many challenges.

In order to overcome some of these challenges, paint in film form has been recently developed for application to such surfaces as an alternative to traditional paint, which traditional paint is typically liquid-based and applied to surfaces in its liquid form. Paint in film form is based on at least one polymeric layer and is also referred to herein as a "polymeric film" or "polymeric paint film." An example of such polymeric paint film is described in U.S. Patent Publication No. 2010/0059167, entitled "Paint Replacement Films, Composites Therefrom, and Related Methods." Further, U.S. Pat. No. 7,678,997 references appliques containing electronic circuitry for an electronic device such as an antenna, which could be embedded in an applique used in paintless aircraft technology.

Not only is visual appeal of electronic circuitry a consideration, but visual obscurity or concealment is another consideration in certain applications. For example, concealment of electronic circuitry used by military in conjunction with mission functions is often desired. To further concealment for such applications, an alternative to conventional roof-mounted antennas is described, for example, by Green-Wave Scientific (Raleigh, N.C.) as an antenna embedded in a rubber mudflap for complete concealment. Further, U.S. Patent Publication No. 2011/0260935 describes an antenna embedded within armor plates on a vehicle. The antenna elements are printed for low profile applications and are for a radio antenna. Still further, Fractal Antenna Systems Inc. (Waltham, Mass.) describes implementation of an antenna in a transparent conductive film under the trade designation, TRANZTENNA, for placement on vehicle windows. U.S. Pat. No. 7,847,745 B2 also describes an antenna embedded in a windshield.

Thin film antennas are described in U.S. Patent Publication No. 2010/0237038 as being used in vehicles, portable electronic devices, and the like, where their application to irregular-shaped surfaces is discussed. However, the antennas are generally described as being positioned on windows and other glass surfaces. Hirschmann Solutions, a division of Hirschmann Car Communication GmbH, also describes a variety of film antennas employing conductive structures printed on transparent, non-conductive films for use in various markets, including the automotive market. Positioning of such film antennas on non-conductive surfaces helps overcome performance problems associated with placement of low profile antennas on conductive surfaces, particularly when operating at relatively low frequencies.

Despite certain advantages associated with their location elsewhere on a vehicle, locating electronic circuitry, such as antennas, on the topside of a vehicle, particularly, in a vehicle's rooftop (which is often a conductive surface), has its advantages. Rooftop location allows an antenna to be either directional (in the case of satellite communications) or omni-directional (in the case of terrestrial communications). Recognizing the advantages of roof-mounted antennas, others have explored ways to conceal the same. For example, Ficosa North America Corp. (Madison Heights, Mich.) describes molding of one or more cavities within a carbon fiber roof for concealed placement of antennas therein. However, this approach is limiting with respect to manufacturing considerations and does not readily allow existing vehicles to be retrofitted with such concealed antennas.

Alternative structures and methods for positioning of electronic circuitry on a vehicle's surface are desired. Particularly desirable are those structures and methods that improve aerodynamic performance of the vehicle and that facilitate concealed placement of electronic circuitry on a vehicle.

SUMMARY OF THE INVENTION

According to the invention, a concealed embedded circuitry structure for facilitating electronic functionality on an article, such as a transportation vehicle, comprises: electronic circuitry; and at least an overlying polymeric layer positioned with respect to the electronic circuitry such that the layer of polymeric material overlies the electronic circuitry when the concealed embedded circuitry is applied to an article, wherein the concealed embedded circuitry has a tapered thickness through at least a portion thereof. In an exemplary embodiment, the electronic circuitry comprises a thin film antenna, a patch antenna, or an antenna array. In another exemplary embodiment, the electronic circuitry comprises a thermofoil. In yet another exemplary embodiment, the electronic circuitry comprises conductive traces for power and signal supply supporting further electronic functionality, such as tracking, surveillance, de-icing, and communicating.

BRIEF DESCRIPTION OF THE DRAWINGS

The drawings herein are not to scale and may illustrate, for example, a tapered concealed embedded circuitry having an exaggerated degree of taper for purposes of illustration only.

FIG. 1C illustrates yet another embodiment of a concealed embedded circuitry structure formed in a mold.

FIG. 1D illustrates the concealed embedded circuitry structure of FIG. 1C after it is removed from the mold.

FIG. 2A illustrates a front perspective view of a transportation vehicle with concealed embedded circuitry structure applied thereto.

DETAILED DESCRIPTION OF THE PREFERRED EMBODIMENTS OF THE INVENTION

Figure 1A:
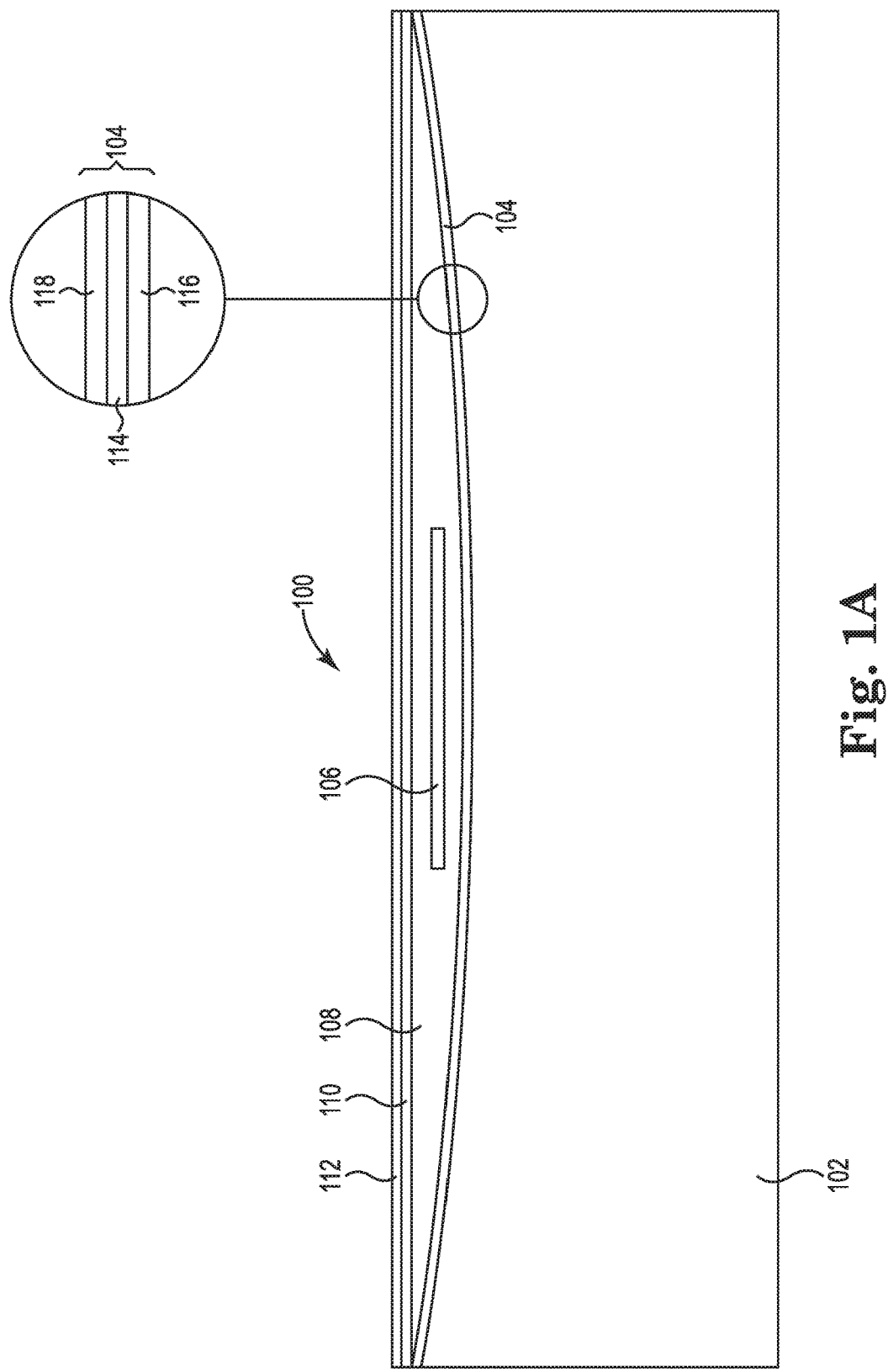
FIG. 1A illustrates one embodiment of a concealed embedded circuitry structure formed in a mold.

Electronic circuitry (including connectors, ground planes, and other structures contributing to functionality of an electronic circuit, all collectively referred to herein, individually or together, simply as "circuitry") for mounting on articles, such as vehicles, according to the invention is concealed by embedding the circuitry using at least an overlying polymeric material within a concealed embedded circuitry structure. Reference herein to "embed," "embedded," "embedding," and the like refers to inclusion of the stated object (i.e., circuitry) as an essential, but not necessarily completely interior, element in the structure. However, in a preferred embodiment, electronic circuitry is encapsulated so that it is completely enclosed (i.e., interior) within a concealed embedded circuitry structure. Reference herein to "concealed embedded circuitry" refers to structures comprising electronic circuitry and outwardly exposed polymeric material that are capable of being applied to an article such that the polymeric material remains outwardly exposed.

In preferred embodiments, concealed embedded circuitry of the invention is capable of being retrofitted to articles after their fabrication. In that manner, antenna functionality, for example, can be provided on a vehicle's rooftop in a manner that is not obvious to an uninformed observer. The presence of the polymeric material in the concealed embedded circuitry in which it is embedded can also advantageously foster performance of the circuitry in certain embodiments (e.g., where the circuitry comprises a low profile antenna mounted over a metallic substrate). In further preferred embodiments, concealed embedded circuitry of the invention is capable of being easily removed from an article when desired and without negatively impacting structure or appearance of the underlying article as it existed before application of the concealed embedded circuitry thereto.

For ease of application to an article, an outer surface of the concealed embedded circuitry preferably comprises at least one adhesive layer according to a further embodiment of the invention. While the adhesive layer can comprise more than one distinct adhesive, the following description is made with reference to one such layer and type of adhesive within that layer for simplicity only. Recognize that, if multiple adhesives or adhesive layers are used, each adhesive or adhesive layer can be the same or different.

The adhesive layer comprises any suitable material. According to one embodiment, the adhesive layer generally comprises a base polymer with one or more additives. While any suitable chemistry can be used for the base polymer in the adhesive layer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene and copolymers thereof, and silicones (e.g., polydimethylsiloxane and polymethylphenylsiloxane).

In a preferred embodiment, the adhesive layer comprises a pressure-sensitive adhesive (PSA). In that manner, concealed embedded circuitry of the invention can be easily applied to an article (e.g., a vehicle) at a desired location and then easily removed from the article when desired and without negatively impacting structure or appearance of the underlying article as it existed before application of the concealed embedded circuitry thereto. Particularly when performing covert operations, such ease of circuitry placement and portability can be highly advantageous.

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, colorants, fillers, and other conventional adhesive additives as known to those of ordinary skill in the art can be incorporated into the adhesive layer.

If present, the adhesive layer comprises any suitable thickness and may be continuous or discontinuous. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness and continuity of the adhesive layer can vary substantially without departing from the spirit and scope of the invention.

The concealed embedded circuitry comprises at least one layer of polymeric material (also referred to herein as a "polymeric layer") positioned with respect to the electronic circuitry such that the layer of polymeric material overlies the electronic circuitry when the concealed embedded circuitry is applied to an article. In one embodiment, the concealed embedded circuitry contains only one polymeric layer. The polymeric layer can be a polymeric film or other polymeric material (e.g., molded polymeric resin). Recognize that the same polymeric layer can not only overlay the electronic circuitry, but it can also underlay the electronic circuitry in a further embodiment. For example, a polymeric film can be wrapped around the electronic circuitry. As a further example, a molded polymeric resin can be formed around the electronic circuitry (e.g., the circuitry could be molded within polymeric resin via a potting process or the circuitry can be later inserted into a cavity molded into the polymeric resin, optionally with potting). In yet a further example, multiple layers of polymeric material are present in the concealed embedded circuitry.

In a further embodiment, the concealed embedded circuitry comprises multiple layers of polymeric material.

According to one aspect of this embodiment, electronic circuitry is sandwiched between the multiple layers of polymeric material. Each layer of polymeric material can be the same or different, and it is to be understood that, if a polymeric film, each polymeric layer can be a single polymeric film or a multi-layer film. Multi-layer films can, optionally, include non-polymeric layers (e.g., metal layers) therein.

Exemplary multi-layer films include, for example, paint in film form. Paint in film form (also referred to herein as "paint film") is applied to a surface in a non-liquid form (i.e., in a cohesive form and a form where removal of excess solvent is unnecessary after its application to a surface) and includes film having essentially one uniform color throughout as well as film which, by itself or in combination with other film, includes graphics, patterns, and other non-uniformly dispersed color variations throughout. Exemplary paint in film form is described in U.S. Patent Publication No. 2010/0059167, incorporated herein by reference in its entirety. In an exemplary embodiment, at least one polymeric layer within the concealed embedded circuitry comprises paint in film form.

In general, paint in film form comprises at least one polymeric layer. While more than one polymeric film can be used within each polymeric layer within paint films of the invention or each such polymeric film can comprise more than one distinct polymer, the following description is made with reference to a polymeric layer that is a single polymeric film formed from a single type of polymer for simplicity only. Recognize, however, that each polymeric film and polymer therein can be the same or different within a polymeric layer of the invention.

Each polymeric film comprises any suitable material. For example, the polymeric film may comprise a polyurethane film, a polyimide film, a polyester film, a polyacrylic film, a polyepoxide film, or a polyester film (e.g., that available from DuPont under the MYLAR trade designation). Although not as preferred, the polymeric film can also be a polyvinyl, such as polyvinyl chloride (PVC), polyvinylidene fluoride (PVDF), or general polyvinyl fluoride (PVF) film (e.g., that available from DuPont under the TEDLAR trade designation). Nevertheless, generally each polymeric film is essentially free of low surface energy materials (e.g., silicones and fluoropolymers, including polyvinylidene fluoride (PVDF) and general polyvinyl fluoride (PVF)), which tend to promote interlayer delamination.

In one embodiment, the polymeric film comprises a polyurethane film. For simplicity, the term "polyurethane" is sometimes used herein to reference polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. Many commercially available polyurethanes are available and suitable for use as polyurethane-based polymeric films according to the invention. For example, suitable polyurethanes are available from entrotech, inc. (Columbus, Ohio) as product numbers 1399 and 1403 under the HAMMERTHANE trade designation.

Any suitable additives can optionally be included in the polymeric film. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, colorants, fillers, and other conventional additives as known to those of ordinary skill in the art can be incorporated into a polymeric film.

Each polymeric layer within the concealed embedded circuitry comprises any suitable thickness, which thickness may be uniform, tapered, or otherwise non-uniform. It has been found that use of relatively thin polymeric layers and/or polymeric layers based on relatively flexible materials (e.g., materials having a Shore Hardness of about 20 A to about 80 D, such as certain polyurethanes, rubber silicones, and other elastomeric materials) contribute to superior flexibility of the concealed embedded circuitry. Such flexibility allows concealed embedded circuitry of the invention to be effectively used in covering articles (e.g., vehicles) having curved or other non-planar surfaces. Recognize that thickness of a polymeric layer can vary throughout. In an exemplary embodiment, a polymeric layer of variable thickness comprises a molded polymeric resin. By varying thickness of the polymeric layer as such, tapered concealed embedded circuitry can be more readily provided.

Concealed embedded circuitry of the invention can comprise an outer clear coat layer. According to a preferred embodiment of the invention, an exterior major surface of a polymeric layer that is outwardly exposed in the concealed embedded circuitry when the concealed embedded circuitry is applied to an article comprises a clear coat layer. When the polymeric layer is a multi-layer film, such as a paint film, the clear coat layer may be considered as part of the multi-layer film. However, the clear coat layer may be separately provided, even when the multi-layer film is a paint film.

In any event, the clear coat layer can comprise any suitable chemistry. In general, the clear coat layer provides one or more properties including the following: environmental resistance, chemical resistance, abrasion resistance, scratch resistance, optical transparency, and other often desirable properties. According to an exemplary embodiment, the clear coat layer comprises a material with the following properties: non-yellowing, gloss retention (e.g., maintaining of gloss on the order of at least about 80-90 gloss units when tested according to ASTM D2457-03 at a 60° angle), and extensibility.

In an exemplary embodiment, the clear coat layer comprises a polyurethane-based material. Many suitable materials for clear coat layers are commercially available, including for example, polyurethane coatings sold by entrotech, inc. of Columbus, Ohio under the AERO trade designation (e.g., AERO™ 220 GSM).

Any suitable additives can optionally be included in the clear coat layer. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, fillers, and other conventional additives as known to those of ordinary skill in the art can be incorporated into the clear coat layer.

If present, the clear coat layer is applied as an exterior major surface of the concealed embedded circuitry (i.e., such that it is an outwardly exposed layer of the concealed embedded circuitry when the concealed embedded circuitry is applied to an article) to a desired thickness according to coating methodology known to those skilled in the art. In an exemplary embodiment, the clear coat layer is applied to a coating weight of about 4 grams per square meter (gsm). Although not limiting with respect to all possible suitable dimensions, in an exemplary embodiment, the total maximum dry thickness of the applied clear coat layer is about 10 microns to about 60 microns, preferably about 20 microns to about 40 microns. Depending on the desired thickness, the clear coat layer can be applied in one or more individual coating layers, together constituting the overall clear coat layer. For example, two individual coating layers comprise the clear coat layer according to one embodiment. In this embodiment, each coating layer is sprayed wet, but not so wet as to flow unevenly across the surface and create a significantly non-uniform clear coat layer.

According to an exemplary embodiment, concealed embedded circuitry of the invention comprises at least one pigmented layer. The pigmented layer can be polymeric, in which case it may be present as a single polymeric layer in the concealed embedded circuitry or it may be present in combination with at least one other polymeric layer therein. In the latter case, the other polymeric layer may be clear or pigmented depending on the application. When the polymeric layer is a multi-layer film, such as a paint film, the pigmented layer may be considered as part of the multi-layer film. However, the pigmented layer may be separately provided, even when the multi-layer film is a paint film.

When present, through its pigment, the pigmented layer, whether it comprises the polymeric layer overlying the electronic circuitry and/or another layer within the concealed embedded circuitry, provides the desired uniform or non-uniform color and/or opacity throughout. Note that the pigmented layer may consist essentially of graphics, patterns, and the like, which results in the pigmented layer being a discontinuous layer and/or a non-planar layer. In general, the pigmented layer(s) provide desired aesthetics when the concealed embedded circuitry is applied to a surface.

While more than one pigmented layer can be included in concealed embedded circuitry of the invention, the following description is made with reference to one such pigmented layer for simplicity only. Recognize that, if multiple pigmented layers are used, each pigmented layer can be the same or different.

The pigmented layer generally comprises at least one material (i.e., pigment, metal, and the like) imparting desired color and opacity to the pigmented layer or portion thereof. Any suitable additives can optionally be used in the pigmented layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the pigmented layer in addition to the pigment.

For optimum concealment of the circuitry, when a clear polymeric layer is positioned such that it overlies the electronic circuitry when the concealed embedded circuitry is applied to an article, a pigmented layer is typically provided between that polymeric layer and the electronic circuitry. Alternatively, or in conjunction with inclusion of the pigmented layer between the polymeric layer and the electronic circuitry, when the polymeric layer overlying the electronic circuitry is clear, a pigmented layer can be provided on the outer major surface of that polymeric layer so that the pigmented layer is outwardly exposed when the concealed embedded circuitry is applied to an article.

When present and distinct from another polymeric layer within the concealed embedded circuitry, a pigmented layer within concealed embedded circuitry of the invention comprises any suitable thickness. Recognize that more than one pigmented layer may be present in the concealed embedded circuitry. For example, when the polymeric layer is positioned with respect to the electronic circuitry such that the layer of polymeric material overlies the electronic circuitry when the concealed embedded circuitry is applied to an article is pigmented, a further pigmented layer can also optionally be provided on the outer or inner surface of that pigmented polymeric layer. In the former embodiment, the polymeric layer can be impregnated with a material (e.g., titanium dioxide) that causes the polymeric layer to function as a reflective background, bringing out the color of the overlying pigmented layer.

One useful paint film as a polymeric layer comprising a multi-layer film according to the invention consists essentially of the following sequential layers: adhesive layer, opacifying layer, base color layer, and clear coat layer. Another useful paint film consists essentially of the following sequential layers: adhesive layer (optionally pigmented to provide enhanced opacification), metal layer (provided by, for example, sputter coating or otherwise metallizing an overlying layer), polyurethane layer (optionally pigmented), and clear coat layer. The layers of each paint film are sequentially listed in order of bottom to top (i.e., outwardly exposed layer) with respect to a major surface of the concealed embedded circuitry after it is applied to an article.

Any suitable electronic circuitry can be included within concealed embedded circuitry of the invention. In a preferred embodiment, the electronic circuitry has a relatively flat structure (i.e., height of the structure is less than at least one of width or length, preferably both width and length of the structure) to facilitate overall improved aerodynamic performance of the article (e.g., vehicle) to which it is applied as compared to that aerodynamic performance associated with positioning of conventional circuitry thereon. In an exemplary embodiment, the circuitry comprises what is known to those of ordinary skill in the art as a patch antenna (e.g., those available from IERUS Technologies, Inc. (Huntsville, Ala.)), a thin film antenna (e.g., those available from IERUS Technologies, Inc. (Huntsville, Ala.)), a film antenna (e.g., those available Hirschmann Solutions, a division of Hirschmann Car Communication GmbH), or an antenna array. In another exemplary embodiment, the circuitry comprises a thermofoil heater (e.g., those available from Minco (Minneapolis, Minn.)).

Concealed embedded circuitry of the invention is useful for application to a wide variety of exterior surfaces. For example, concealed embedded circuitry of the invention finds particular beneficial use when applied to exterior surfaces of many transportation vehicles. In an exemplary embodiment, concealed embedded circuitry of the invention is effectively and durably applied to the exterior surface of a terrestrial-based transportation vehicle. When applied, concealed embedded circuitry of the invention can cover substantially all of or select portions of such exterior surfaces. The circuitry therein is positioned as desired on the vehicle's surface. In one embodiment, the concealed embedded circuitry is positioned on a topside of the vehicle—e.g., on the rooftop of a vehicle—in a manner such that it is not distinguishable from the surface on which it is applied.

Recognize also that an article may have more than one discrete concealed embedded circuitry structure applied thereto, each of which may have varying dimensions. For example, similar application of protected graphics assemblies having varying dimensions to vehicles, such as race cars, is described in U.S. Patent Publication No. 2009/0186198, incorporated herein by reference.

According to one aspect of the invention, a transportation vehicle comprises concealed embedded circuitry applied to at least a portion thereof. In an exemplary embodiment, the concealed embedded circuitry has a dimension of at least about 30 centimeters along its major axis. According to a further exemplary embodiment, the concealed embedded circuitry has a dimension of at least about 60 centimeters along its major axis. According to an exemplary aspect of the invention, the concealed embedded circuitry has at least a length or width dimension that approximates the same dimension of a surface onto which it is applied. For example, the concealed embedded circuitry has a width approximating the width of a vehicle's rooftop according to one embodiment. According to a further embodiment, the concealed embedded circuitry has a width approximating the width of a vehicle's rooftop as well as a length approximating the length of the vehicle's rooftop. The invention is not to be limited, however, with respect to the dimensions described in conjunction with this aspect of the invention.

Preferably, the concealed embedded circuitry has a tapered thickness through at least a portion thereof. For example, as discussed above, the tapered thickness can be provided by inclusion of a polymeric layer having a variable thickness therein. Such a polymeric layer comprises a molded polymeric resin in one embodiment. By varying thickness of the polymeric layer as such, tapered concealed embedded circuitry can be more readily provided.

In an exemplary embodiment, the concealed embedded circuitry smoothly tapers from its thickest point (e.g., a point that is at the center of the concealed embedded circuitry) to its thinnest point (e.g., a point along an edge of the concealed embedded circuitry). The thickness of the concealed embedded circuitry is tapered to such a degree that significantly differing angles of reflected light across the outwardly exposed major surface of the concealed embedded circuitry are essentially eliminated.

Preferably, across the major surface of the concealed embedded circuitry that is to be outwardly exposed upon application of the concealed embedded circuitry to an article, at no point is there a change in angle of more than about five degrees, and any change of angle thereon is preferably about three degrees or less. Reflecting this minimal change in angle, according to a preferred embodiment, essentially all tangents at any points along the outwardly exposed major surface of concealed embedded circuitry are within about five degrees of the tangent at a corresponding point on the article perpendicular thereto. As such, no visible steps, or abrupt changes in height, are typically noticeable on the outwardly exposed major surface of the concealed embedded circuitry. A smooth taper from the thickest point to the thinnest point on concealed embedded circuitry is preferable in that it allows the outwardly exposed major surface of the concealed embedded circuitry to remain nearly parallel to the underlying substrate when viewed in its entirety. In addition to following a smooth curve, the outwardly exposed major surface of the concealed embedded circuitry more readily replicates texture (e.g., smoothness) of the underlying article (e.g., a conventional autobody panel). When concealed embedded circuitry of the invention is used on a conventional autobody panel in conjunction with paint film (or even an autobody panel that is conventionally painted), for example, surface qualities of a conventional automotive paint finish are obtainable.

Advantageously, when tapered as described herein, the concealed embedded circuitry can be applied to a surface in a further concealed manner. For example, the taper in such concealed embedded circuitry can be designed such that at least a portion of the exterior surface, preferably the entire exterior surface, to which such concealed embedded circuitry is applied appears essentially smooth (e.g., planar) when viewed by an unaided human eye. That is, preferably the concealed embedded circuitry is evenly tapered across the entire exterior surface to which it is applied. In that manner, there can be essentially no apparent change in height adjacent the concealed embedded circuitry, which is often the thickest part of the structure, when viewed across such a surface, resulting in improved concealment of the electronic circuitry as well as improved aerodynamic performance (i.e., reduced drag) when, for example, the concealed embedded circuitry is applied to the rooftop of a vehicle.

When tapered, the change in thickness across concealed embedded circuitry of the invention can vary and depends, in part, on the distance over which the tapered thickness extends. In an exemplary embodiment, the concealed embedded circuitry has a tapered thickness extending across a distance of at least about 0.2 meter. In another exemplary embodiment, the concealed embedded circuitry has a tapered thickness extending across a distance of at least about 0.5 meter.

According to one embodiment of the invention, particularly when the concealed embedded circuitry comprises paint film, the concealed embedded circuitry has a maximum thickness that is at least about two times the minimum thickness within the concealed embedded circuitry. According to a further aspect of this embodiment of the invention, the concealed embedded circuitry has a maximum thickness that is at least about five times the minimum thickness within the concealed embedded circuitry. According to yet a further aspect of this embodiment of the invention, the concealed embedded circuitry has a maximum thickness that is at least about twenty times the minimum thickness within the concealed embedded circuitry. According to a still further aspect of this embodiment of the invention, the concealed embedded circuitry has a maximum thickness that is at least about fifty times the minimum thickness within the concealed embedded circuitry. According to an even further aspect of this embodiment of the invention, the concealed embedded circuitry has a maximum thickness that is at least about one-hundred times the minimum thickness within the concealed embedded circuitry. According to an even further aspect of this embodiment of the invention, the concealed embedded circuitry has a maximum thickness that is at least about two-hundred times the minimum thickness within the concealed embedded circuitry.

In an exemplary embodiment, the concealed embedded circuitry has a tapered thickness with a thickness on the order of microns in magnitude on at least one edge thereof. For example, in one embodiment, the concealed embedded circuitry has a thickness of about 20 to about 75 microns on at least one edge thereof. Overall, the concealed embedded circuitry has a maximum thickness of no more than about 4 millimeters in an exemplary embodiment. According to a further exemplary embodiment, the concealed embedded circuitry has a maximum thickness of no more than about 2 millimeters. Based on these dimensions, significant advantages in, for example, aerodynamic performance can be imparted to a vehicle (e.g., a race car). Again, see U.S. Patent Publication No. 2009/0186198.

The concealed embedded circuitry can be applied to a surface according to principles and methodologies understood by those of ordinary skill in the art. Until the concealed embedded circuitry is applied to a surface, it can be stored with an optional release liner or similar temporary protective material adjacent the optional adhesive layer and with an optional carrier on the opposite side thereof. The selection and use of such carriers and liners is within the knowledge of one of ordinary skill in the art.

When applying the concealed embedded circuitry to a surface, the release liner or similar temporary protective material, if present, is first removed. Then, the surface to which the concealed embedded circuitry is to be applied can optionally be sprayed with a cleaning agent (e.g., a mixture of 3 parts water to 1 part isopropanol). Still further, once the concealed embedded circuitry is positioned over the surface to which it is to be applied, the overall concealed embedded circuitry may also be sprayed with such an agent. Thereafter, the concealed embedded circuitry is firmly applied to the underlying surface using, for example, a squeegee. The concealed embedded circuitry is allowed to set for a time sufficient to prevent inadvertent removal of the concealed embedded circuitry upon removal of any carrier used in conjunction therewith. The carrier, if present, is then removed.

Recognize that, depending on the construction of the concealed embedded circuitry, it may be applied to an article in one or more parts. For example, when the concealed embedded circuitry comprises paint film, the paint film may be applied separately from remaining portion(s) of the concealed embedded circuitry.

EXAMPLES

Exemplary embodiments and applications of the invention are described in the following non-limiting prophetic examples.

Example 1

A master mold having an opening measuring about 50 centimeters by 50 centimeters (20 inches by 20 inches) and a thickness of about 25 millimeters (1 inch) can be created using, for example, computer numerical control (CNC). Dimensions of the mold can be tailored according to the application of the concealed embedded circuitry to be formed therein.

In one embodiment, an open pour mold is created to have an opening measuring approximately the same length and width dimensions as a rooftop on a vehicle. The open pour mold has a releasable surface, which can be, for example, provided by application of a mold release material via plasma coating, spray coating, and the like. A paint film having a thickness of about 0.15 millimeter (0.006 inch) is then inserted into the mold so that the side of the paint film contacting the mold is to be outwardly exposed on the concealed embedded circuitry when the concealed embedded circuitry is applied to an article.

A film antenna measuring about 10 centimeters by 15 centimeters (4 inches by 6 inches) and having a thickness of 1.1 millimeters (0.045 inch) is then inserted on top of the paint film and spacer beads are used to suspend the antenna to a desired height and in a tapered manner above the paint film. Although many variations are suitable and use of spacer beads is not needed in many embodiments, the spacer beads used can be made of glass and have a maximum dimension (e.g., diameter) of about 0.64 millimeter (0.025 inch). Although the plane of the film antenna will likely be parallel to the plane of the paint film and surface plane of the article onto which the concealed embedded circuitry will be applied, orientation of the film antenna need not be critical, as the mold opening can be adequately spaced to allow for almost any orientation therein.

A flexible polymeric resin is then poured into the mold. Any flexible polymeric resin can be used, including ultraviolet-curable resins and two-part resins (e.g., elastomeric polyurethane). A glass sheet is then placed over the filled mold to level the polymeric resin therein during curing. Optionally, another layer of paint film could be inserted between the polymeric resin and the glass sheet.

When desired, an adhesive layer is then formed on the molded polymeric resin according to methodologies known to those of ordinary skill in the art.

Example 2

As illustrated in FIG. 1A, a concealed embedded circuitry structure 100 is formed in a mold 102. The concealed embedded circuitry structure 100 includes a paint film 104 overlying electronic circuitry 106. Further, a polymeric resin 108 surrounds the electronic circuitry 106. On the side of the electronic circuitry 106 opposite the paint film 104, is an adhesive layer 110 that is protected by a release liner 112, which release liner is removed prior to applying the concealed embedded circuitry structure 100 to an article with the aid of the adhesive layer 110. In this embodiment, the paint film 104 consists of a pigmented layer 114 sandwiched between a transparent polymeric film 116 and an adhesive layer 118. The paint film 104 is positioned such that the transparent polymeric film 116 is the outermost layer when the concealed embedded circuitry structure 100 is applied to an article.

Example 3

Figure 1B:
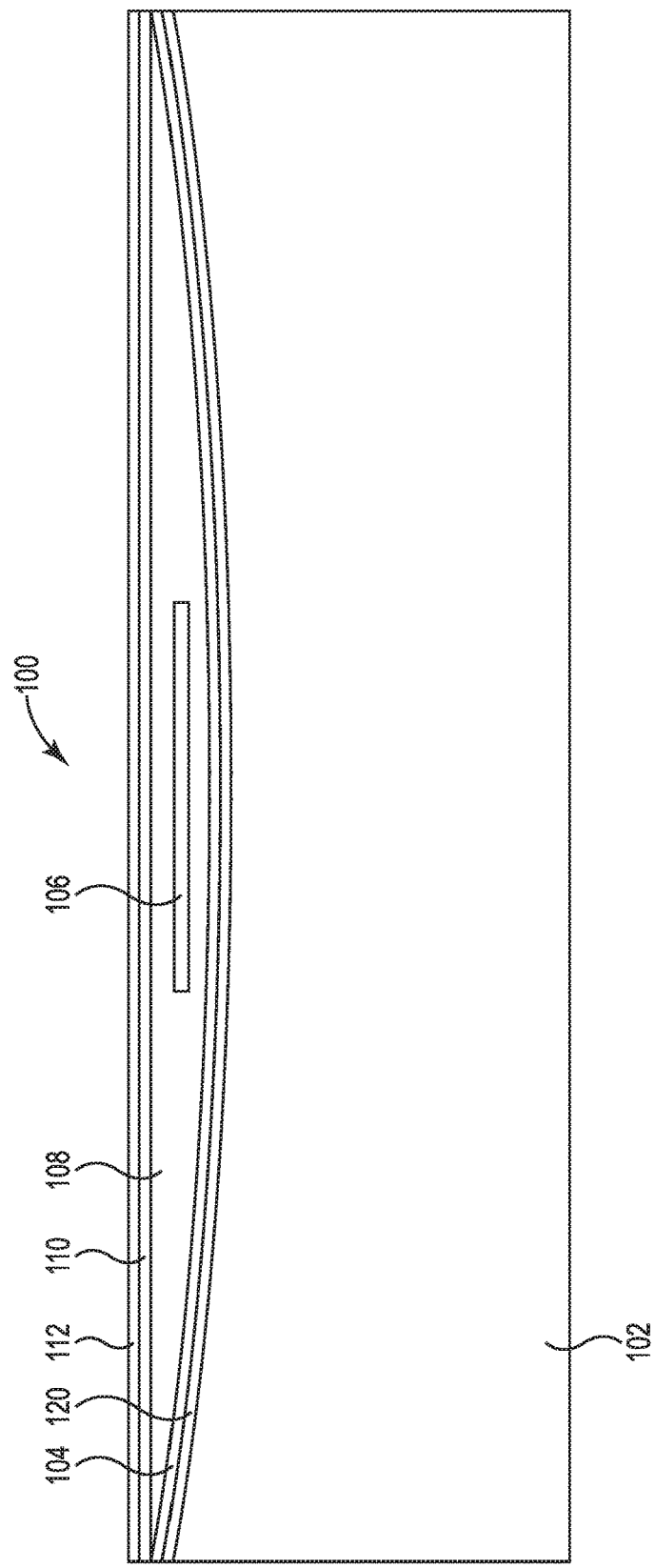
FIG. 1B illustrates another embodiment of a concealed embedded circuitry structure formed in a mold.

As illustrated in FIG. 1B, a concealed embedded circuitry structure 100 as described in Example 2 is formed in a mold 102, except that a polymeric layer 120 is inserted in the mold 102 prior to and in addition to the paint film 104. Thus, the polymeric layer 120 is the outermost layer when the concealed embedded circuitry structure 100 is applied to an article.

Example 4

As illustrated in FIG. 1C, a concealed embedded circuitry structure 100 as described in Example 2 is formed in a mold 102, except that a polymeric layer 120 is inserted in the mold 102 after and in addition to the paint film 104. As in FIG. 1A, the transparent polymeric film 116 is the outermost layer when the concealed embedded circuitry structure 100 is applied to an article. FIG. 1D illustrates the concealed embedded circuitry 100 after it is removed from the mold 102 and prior to its application to an article.

Example 5

Figure 2B:
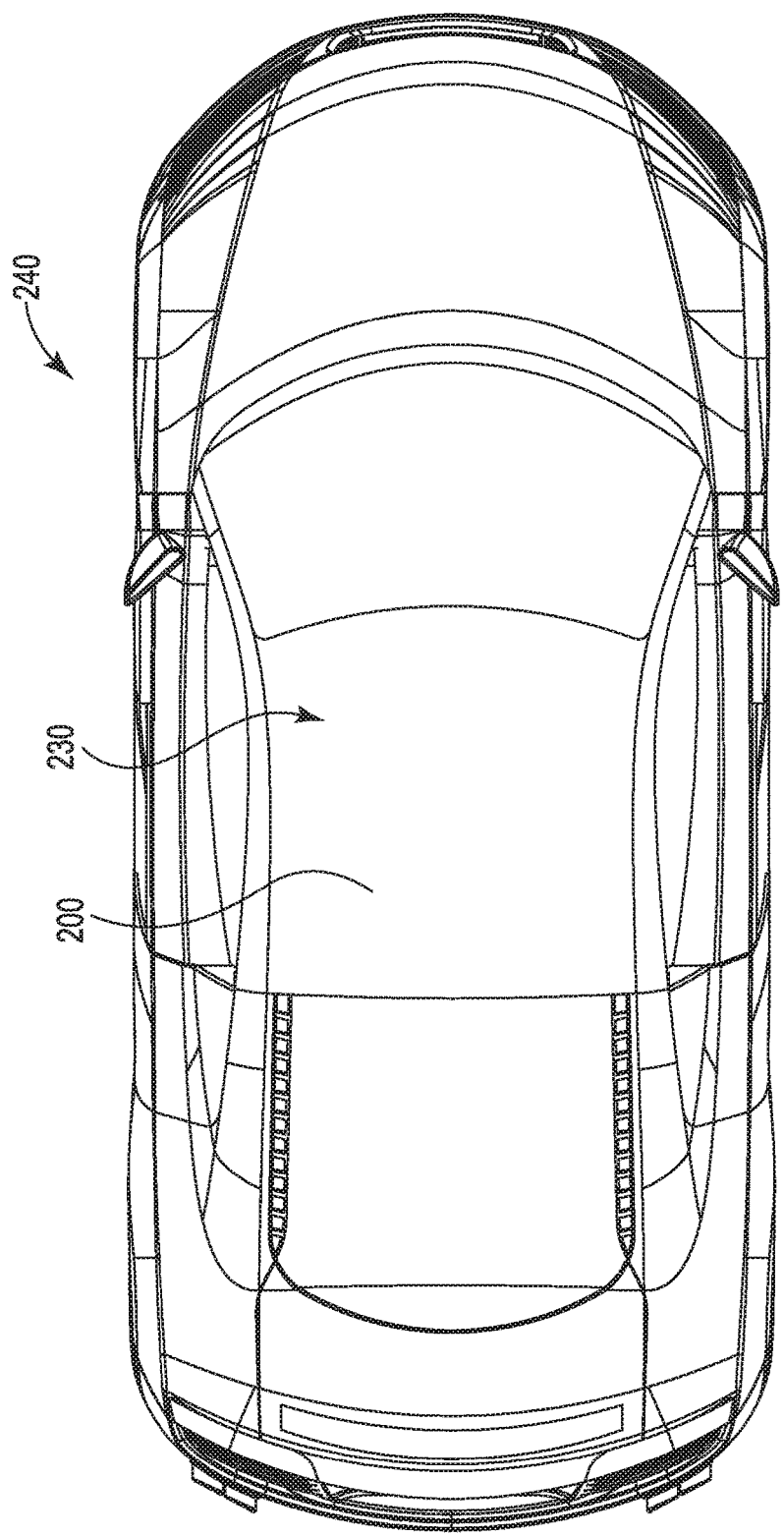
FIG. 2B illustrates a side perspective view of the transportation vehicle of FIG. 2A.
Figure 2C:
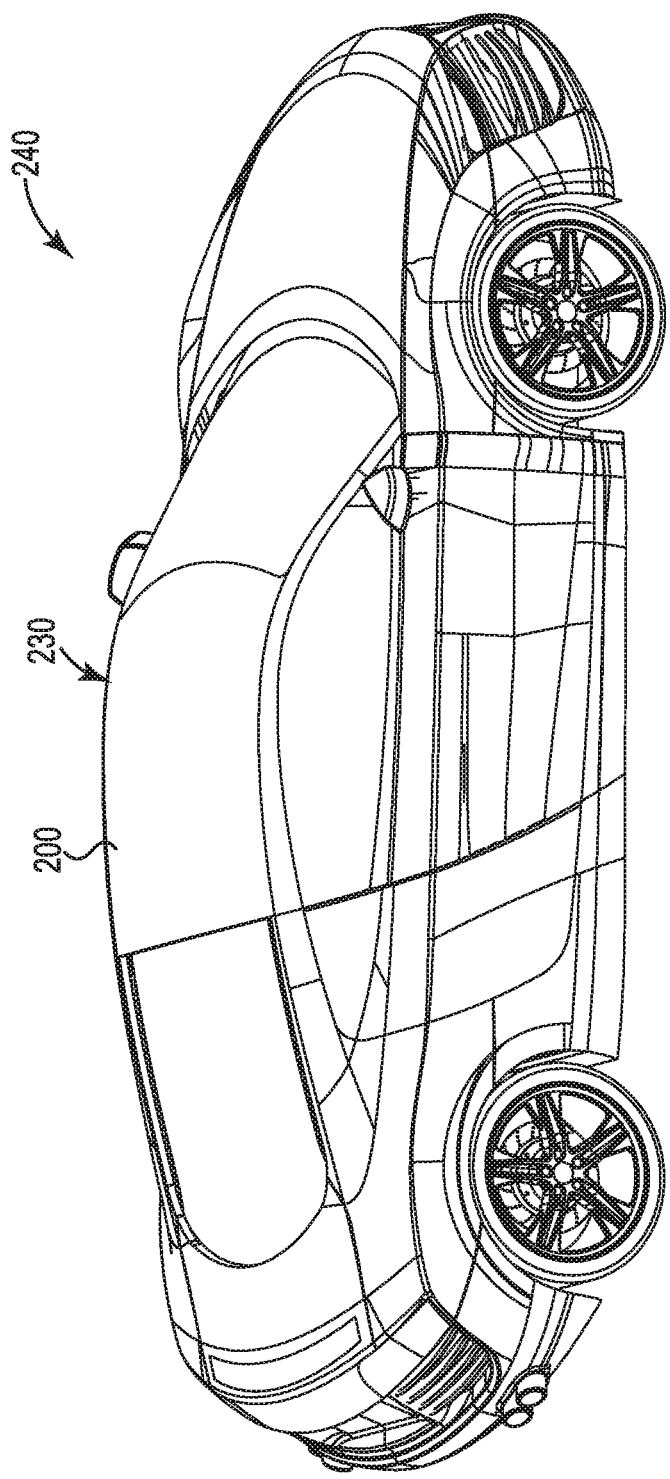
FIG. 2C illustrates a top perspective view of the transportation vehicle of FIG. 2A.

As illustrated in FIGS. 2A-2C, a concealed embedded circuitry structure 200 is applied to a rooftop 230 of a transportation vehicle 240 according to one embodiment of the invention.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A concealed embedded circuitry structure for facilitating electronic functionality on an article, the concealed embedded circuitry comprising:
  electronic circuitry; and
  at least an overlying polymeric layer positioned with respect to the electronic circuitry such that the layer of polymeric material overlies the electronic circuitry and visually conceals the electronic circuitry when the concealed embedded circuitry is applied to the article, wherein the concealed embedded circuitry has a tapered thickness through at least a portion thereof.

2. The structure of claim 1, wherein the overlying polymeric layer comprises polyurethane.

3. The structure of claim 1, wherein the overlying polymeric layer comprises a multi-layer film.

4. The structure of claim 3, wherein the overlying polymeric layer comprises a paint film.

5. The structure of claim 3, wherein the multi-layer film comprises a pigmented layer.

6. The structure of claim 1, wherein the concealed embedded circuitry comprises a clear coat layer positioned such that it is outwardly exposed when the concealed embedded circuitry is applied to the article.

7. The structure of claim 1, further comprising a pigmented layer.

8. The structure of claim 1, wherein the electronic circuitry is sandwiched between multiple polymeric layers.

9. The structure of claim 8, wherein the electronic circuitry is sandwiched between multiple paint films.

10. The structure of claim 1, wherein the overlying polymeric layer is a molded polymeric resin.

11. The structure of claim 10, wherein the molded polymeric resin is pigmented.

12. The structure of claim 1, wherein an outer surface of the concealed embedded circuitry comprises an adhesive layer positioned to facilitate adherence of the concealed embedded circuitry to the article.

13. The structure of claim 12, wherein the adhesive layer comprises a pressure-sensitive adhesive.

14. The structure of claim 1, wherein the electronic circuitry comprises a thin film antenna.

15. The structure of claim 1, wherein the electronic circuity comprises a patch antenna.

16. The structure of claim 1, wherein the electronic circuitry comprises an antenna array.

17. The structure of claim 1, wherein the electronic circuitry comprises a thermofoil.

18. The structure of claim 1, wherein the electronic circuitry comprises conductive traces for power and signal supply supporting further electronic functionality.

19. The structure of claim 1, wherein the electronic functionality comprises at least one of tracking, surveillance, de-icing, and communicating.

20. The structure of claim 1, wherein at no point across an outwardly exposed major surface of the concealed embedded circuitry is there a change in angle of more than about five degrees upon application of the concealed embedded circuitry to the article.

21. The structure of claim 1, wherein the concealed embedded circuitry remains nearly parallel to the underlying article when viewed in its entirety upon application of the concealed embedded circuitry to the article.

22. The structure of claim 1, wherein the concealed embedded circuitry has a maximum thickness that is at least about twenty times a minimum thickness within the concealed embedded circuitry.

23. The structure of claim 1, wherein the concealed embedded circuitry has a maximum thickness that is at least about one-hundred times a minimum thickness within the concealed embedded circuitry.

24. A transportation vehicle comprising the structure of claim 1 applied to at least a portion thereof.

25. The transportation vehicle of claim 24, wherein the vehicle is a race car.

26. The transportation vehicle of claim 24, wherein the structure has a dimension of at least about 60 centimeters along its major axis.

27. The transportation vehicle of claim 24, wherein the structure has a thickness on the order of microns in magnitude on at least one edge thereof.

28. The transportation vehicle of claim 24, wherein the structure has a thickness of about 20 microns to about 75 microns on at least one edge thereof.

29. The transportation vehicle of claim 24, wherein the structure has a maximum thickness of no more than about 4 millimeters.

30. The transportation vehicle of claim 24, wherein the structure has a maximum thickness of no more than about 2 millimeters.

31. The transportation vehicle of claim 24, wherein the concealed embedded circuitry is evenly tapered across the entire portion of the transportation vehicle to which it is applied.

32. The transportation vehicle of claim 31, wherein the portion of the transportation vehicle to which the concealed embedded circuitry is applied is a rooftop.

33. The structure of claim 1, wherein the concealed embedded circuitry has a maximum thickness that is at least about two times a minimum thickness within the concealed embedded circuitry.

34. The structure of claim 1, wherein the concealed embedded circuitry has a maximum thickness that is at least about five times a minimum thickness within the concealed embedded circuitry.

* * * * *